(12) United States Patent
Poulsen

(10) Patent No.: US 7,948,678 B1
(45) Date of Patent: May 24, 2011

(54) FOUR-REGION CATADIOPTRIC TILE

(75) Inventor: Peter Poulsen, Grants Pass, OR (US)

(73) Assignee: Merlin Technologies, LLC, Grants Pass, OR (US)

(*) Notice: Subject to any disclaimer, the term of this patent is extended or adjusted under 35 U.S.C. 154(b) by 0 days.

(21) Appl. No.: 12/658,394

(22) Filed: Feb. 6, 2010

(51) Int. Cl.
*G03B 21/60* (2006.01)

(52) U.S. Cl. .................. 359/454; 359/459; 359/741

(58) Field of Classification Search .......... 359/443, 359/449, 454–455, 459, 460, 741
See application file for complete search history.

(56) References Cited

U.S. PATENT DOCUMENTS

| | | | |
|---|---|---|---|
| 3,754,813 A | 8/1973 | Depalma | |
| 4,241,980 A * | 12/1980 | Mihalakis et al. | 359/455 |
| 5,127,722 A | 7/1992 | Nishitani | |
| 5,513,037 A | 4/1996 | Yoshida | |
| 6,034,817 A | 3/2000 | Mihalakis | |
| 6,130,777 A | 10/2000 | Yamashita | |
| 6,424,463 B1 | 7/2002 | Nishitani | |
| 6,437,917 B1 | 8/2002 | Ooshima et al. | |
| 6,574,041 B1 | 6/2003 | Chen | |
| 6,600,600 B2 | 7/2003 | Chen | |
| 7,054,068 B2 | 5/2006 | Yoshida | |
| 7,092,166 B1 | 8/2006 | Wood | |
| 7,349,154 B2 | 3/2008 | Aiura | |
| 7,408,709 B2 | 8/2008 | Shimoda et al. | |
| 7,619,824 B2 * | 11/2009 | Poulsen | 359/455 |
| 2008/0043326 A1 | 2/2008 | Poulsen | |

FOREIGN PATENT DOCUMENTS

| | | |
|---|---|---|
| JP | 8-8168 | 1/1996 |
| JP | 10-20242 | 1/1998 |
| JP | 2002-49326 | 2/2002 |
| JP | 2002-90313 | 3/2002 |
| JP | 2002-122416 | 4/2002 |
| JP | 2002-350724 | 12/2002 |

* cited by examiner

*Primary Examiner* — Christopher Mahoney

(57) ABSTRACT

This invention presents a four-region catadioptric tile. The four-region catadioptric tile includes a first surface, a second surface, and a filler material layer between the first and second surfaces. The four regions includes a first region wherein the first surface is convex and the second surface is convex, a second region wherein the first surface is convex and the second surface is concave, a third region wherein the first surface is concave and the second surface is convex, and a third region wherein the first surface is concave and the second surface is concave. The surface morphology of each of the four-region catadioptric tiles can be repeated across an entire tessellated projection screen or an angularly dependent retroreflector.

30 Claims, 4 Drawing Sheets

FOUR-REGION CATADIOPTRIC TILE

BACKGROUND OF THE INVENTION

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

1. Field of the Invention

The present invention relates generally to a catadioptric tile for tessellated projection-receiving surfaces, and more particularly to a catadioptric tile having four distinct regions.

2. Description of Related Art

Projection-receiving surfaces have been used for various purposes, including displaying a projected image for the view of an audience. Various constructions have been developed in an effort to improve the quality of reflection for different applications.

However, with the traditional projection-receiving surfaces, including front projection or rear projection screen technologies, optimization of a balance between the surface's gain, contrast and view angle have not been robust with variable parameters.

SUMMARY OF THE INVENTION

The present invention provides a four-region catadioptric tile. The four-region catadioptric tile includes a first surface, a second surface, and a filler material layer between the first and second surfaces. The four regions include a first region wherein the first surface is convex and the second surface is convex, a second region wherein the first surface is convex and the second surface is concave, a third region wherein the first surface is concave and the second surface is convex, and a third region wherein the first surface is concave and the second surface is concave.

In a preferred embodiment, the first surface can be a refraction surface and the second surface can be a reflection surface. Preferably, the four-region catadioptric tiles can be rectangular.

In a preferred embodiment, the first surface can be defined by a first equation:

$$Z_e = \{[(0.5Y_0/\tan\phi)^2 - (0.5(Y-Y_0))^2]^{0.5}\} + \{\Sigma_i \beta_i \sin(\pi f_i X/X_0) + K\}$$

wherein:

$Z_e$ is a thickness of the filler material layer between a reference plane and the first surface;

$Y_0$ is one half of a dimension of the four-region catadioptric tile measured along a first axis;

$Y$ is a position relative to a center of the four-region catadioptric tile along the first axis;

$\phi$ is one half of an approximate total view-field angle along the first axis;

$\beta$ is amplitude of a maximum deflection relative to a mean value along a second axis;

$f_i$ is spatial frequency as a multiple of a frequency associated with $2X_0$ frequency;

$X_0$ is one half of a dimension of the four-region catadioptric tile along the second axis;

$X$ is a position relative to a center of the four-region catadioptric tile along the second axis; and $K$ is an offset that keeps the first and second surfaces from physically interfering.

In a preferred embodiment, the second surface can be defined by a second equation:

$$Z_r = \{[(X_0/2\sin\theta)^2 - (X - 0.5X_0)^2]^{0.5} + [0.5X_0/\tan\theta)]\}$$

$$+ \{0.5X_0[(1/\sin\theta) - (1/\tan\theta)]\} + \{\Sigma_j \alpha_j \sin(\pi\mu_j Y/Y_0) + K\}$$

wherein:

$Z_r$ is a thickness of said filler material layer between said reference plane and said second surface;

$\theta$ is one quarter of an approximate total view-field angle along said second axis;

$\alpha_j$ is amplitude of a maximum deflection relative to a mean value along said first axis; and $\mu_j$ is spatial frequency as a multiple of a frequency associated with the $2Y_0$ frequency.

In a preferred embodiment, a maximum value for the sum of $Z_e$ plus $Z_r$ is 5 mm or less. Further preferably, the maximum value for the sum of $Z_e$ plus $Z_r$ is 1 mm or less, further preferably 0.5 mm or less, or yet further preferably 0.25 mm or less. $X_0$ is preferably 5 mm or less, further preferably 1 mm or less, further preferably 0.5 mm or less, or yet further preferably 0.25 mm or less. $Y_0$ is preferably 5 mm or less, further preferably 1 mm or less, further preferably 0.5 mm or less, or yet further preferably 0.25 mm or less. $\alpha_j$ and $\beta_i$ are preferably 1.0 or less, further preferably 0.2 or less, or yet further preferably 0.1 or less. In addition, $f_i$ and $\mu_j$ are preferably 1.0 or less, further preferably 0.2 or less, or yet further preferably 0.1 or less.

In a preferred embodiment, the four-region catadioptric tile can further include a thin layer coated on the first surface. Preferably, the parameters in the equations ($X_0$, $\theta$, $Y_0$, $\phi$) and the index of refraction of the thin layer can be selected such that the portion of light that enters the four-region catadioptric tile from an off-axis angle equal to or greater than 60 degrees can on average be captured within the filler material layer for a minimum of three times the mean thickness of the four-region catadioptric tile. Further, the parameters in the equations and the index of refraction of the thin layer can be selected such that the portion of light that enters the four-region catadioptric tile from an off-axis angle equal to or greater than 60 degrees can on average be captured within the filler material layer for a minimum of five times the mean thickness of the four-region catadioptric tile. Yet further, the parameters in the equations and the index of refraction of the thin layer can be selected such that the portion of light that enters the four-region catadioptric tile from an off-axis angle equal to or greater than 60 degrees can on average be captured within the filler material layer for a minimum of ten times the mean thickness of the four-region catadioptric tile.

In a preferred embodiment, $\beta_i$, and $f_i$ can be selected such that the portion of light that is reflected at the first surface or at the thin layer can be reduced in amplitude as though spread out by at least five times the width of the four-region catadioptric tile. Further, $\beta_i$, and $f_i$ can be selected such that the portion of light that is reflected at the first surface or at the thin layer can be reduced in amplitude as though spread out by at least ten times the width of the four-region catadioptric tile. Yet further, $\beta_i$, and $f_i$ can be selected such that the portion of light that is reflected at the first surface or at the thin layer can be reduced in amplitude as though spread out by at least twenty times the width of the four-region catadioptric tile.

In a preferred embodiment, the first axis can be a vertical axis and the second axis can be a horizontal axis.

In a preferred embodiment, the thin layer can have a refractive index higher than a refractive index of the filler material layer. The refractive index of the thin layer can be selected to be at least 10% higher than the refractive index of the filler material layer. Further, the refractive index of the thin layer can be selected to be at least 25% higher than the refractive index of the filler material layer. Yet further, the refractive index of the thin layer can be selected to be at least 50% higher than the refractive index of the filler material layer.

In a preferred embodiment, the filler material layer can include an absorptive element. Additionally or alternatively, the filler material layer can be comprised of multiple layers. Additionally or alternatively, the filler material layer can have a taper.

In a preferred embodiment, the four-region catadioptric tile can be prepared by any process selected from the group comprising machining, milling, etching, photo-process, broaching, roll forming, flat pressing, stamping, vacuum forming, electroforming, film suspension, molding, casting, injection, deposition, printing and precipitation. Any of these processes can provide edge-to-edge continuity to form a tessellated reflection surface suitable for an image projection screen.

In a preferred application the tile can be used as an angularly dependent retroreflector. This will allow reflection of light sources such as car headlamps to bounce back to the region of the lamps only when the tile and the lamp are within a specific range of locations and orientations relative to each other. Outside of that range, the light is directed in other prescriptive directions. Therefore, tiles can be used as markers that are functional to a car driver, for example, when in certain locations, without confusing others who are located elsewhere even though the lights may fall upon the tiles. At the same time, lights located at selected places relative to the tiles and their orientations can be used to provide specified areas of visibility of the reflections to guide cars, airplanes and other moving items in accord with the locations of such items, without such guiding light being visible at other locations. Spaced and oriented appropriately on a curve in the road, the tiles can illuminate at rates associated with the speed of a car, thereby alerting a driver to excessive speed that could produce an accident.

In another preferred application of the four-region catadioptric tile, the four-region catadioptric tile can be used to form a tessellated projection screen where the surface morphology of the four-region catadioptric tile is repeated across the entire tessellated projection screen.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Figure 1:
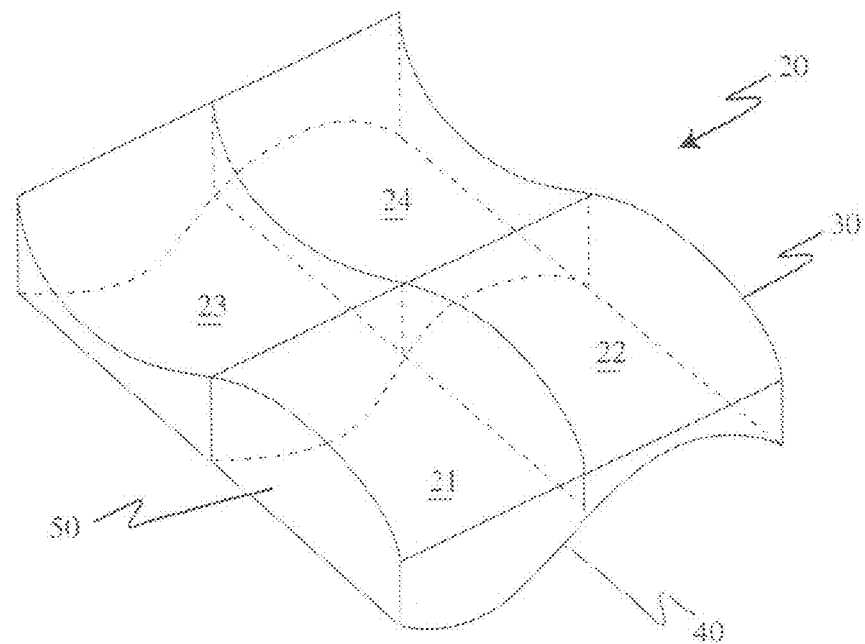
FIG. 1 is a perspective view of a four-region catadioptric tile according to the present invention, wherein the primary contours of the four-region catadioptric are shown while the secondary contours thereof are omitted.

FIG. 1 shows a four-region catadioptric tile 20 according to the present invention. As seen in FIG. 1, the four-region catadioptric tile 20 has a front surface 30, a rear surface 40 and a transparent filler material layer 50 therebetween to produce a sandwich structure of shallow depth relative to the defining length and width of the four-region catadioptric tile 20. The four-region catadioptric tile 20, as is the nature of a catadioptric optical system, combines refractive and reflective elements to achieve the desired directing of light. In a preferred embodiment of the present invention, the front surface 30 is refractive and constitutes an entry surface. Light passing through this refractive front surface 30 is deviated in accord with Snell's law, and then continues on through the filler material layer 50 until it strikes the reflective rear surface 40, whereupon the light is deviated in accord with the geometric principles of reflection for structures considerably larger than the wavelength of the light. The reflected light, to the degree not lost by attenuation in the filler material layer 50, exits back outward through the refractive front surface 30, with direction in accord with Snell's law. Alternatively, both the front surface 30 and the rear surface 40 can be refractive. In this alternative embodiment, light passing through the refractive rear surface 40 is deviated in accord with Snell's law, and then continues on through the filler material layer 50 until it reaches the refractive front surface 30. The light, to the degree not lost by attenuation in the filler material layer 50, exits outward through the refractive front surface 30, with direction in accord with Snell's law.

Figure 6:
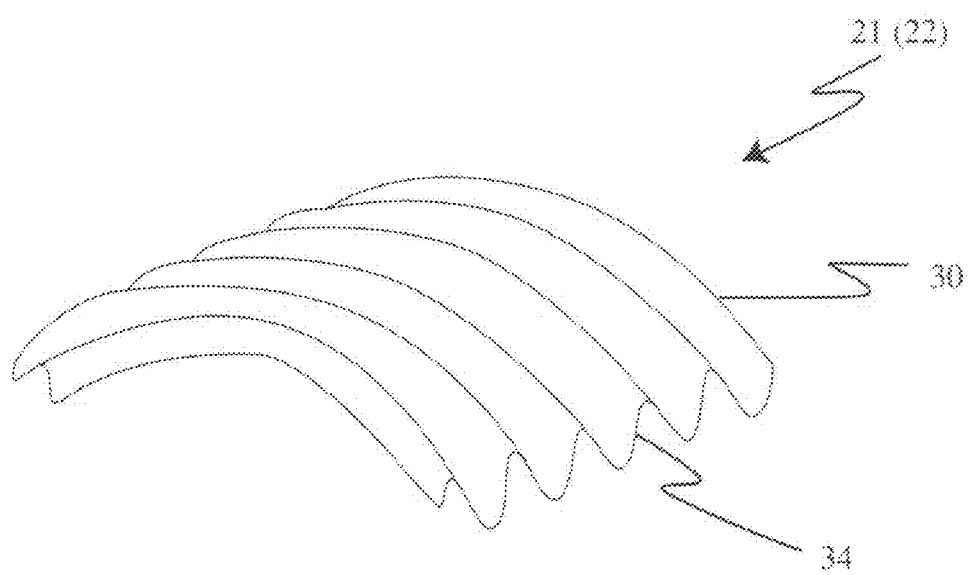
FIG. 6 is an enlarged perspective view of one quadrant of the front surface of the four-region catadioptric tile of FIG. 1, wherein the secondary contours are incorporated.

As seen in FIG. 1, the four-region catadioptric tile 20 according to the present invention has four distinct regions 21, 22, 23, 24. In FIG. 1, only primary contours of the catadioptric tile 20 are shown, and secondary contours of the catadioptric tile 20 are omitted. As shown on the front surface 30 of one quadrant 21 in FIG. 6, the secondary surface contours of the four-region catadioptric tile 20 can be superimposed on the primary contours of the four-region catadioptric tile 20 shown in FIG. 1. The four-region catadioptric tile 20 uses a different combination of the front and rear surface primary curvatures for each of its four regions 21, 22, 23, 24: front convex—rear convex 21; front convex—rear concave 22; front concave—rear convex 23; front concave—rear concave 24. In the general case the frontal shape of the four-region catadioptric tile 20 is that of a rectangle, with the special case for a rectangle being the shape of a square.

Figure 2:
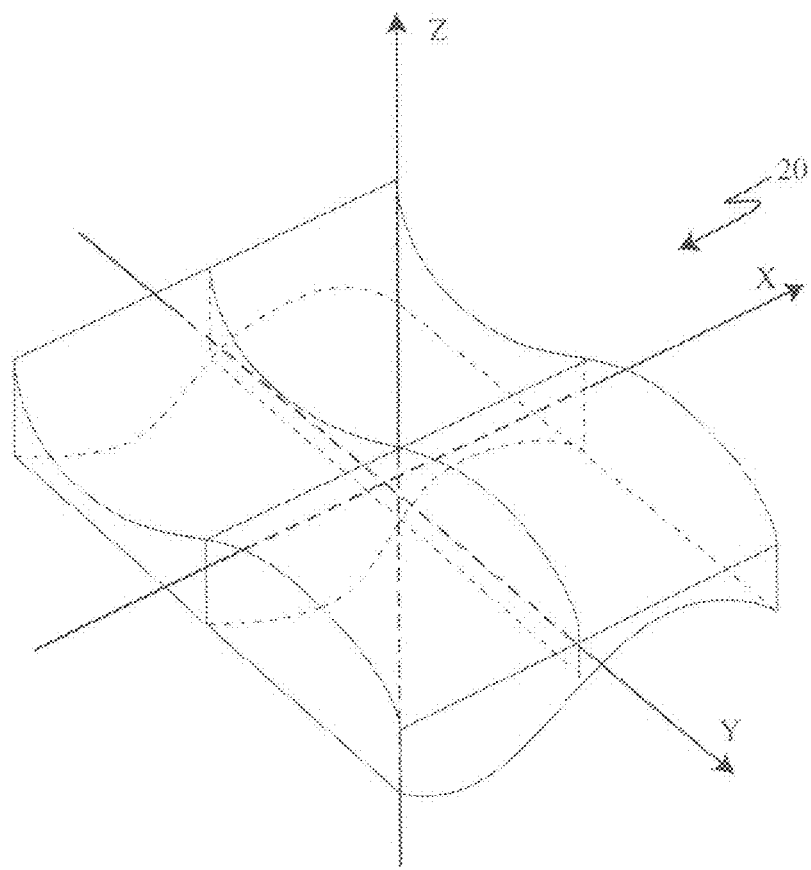
FIG. 2 is a perspective view of the four-region catadioptric tile of FIG. 1, with X, Y and Z coordinate axes shown.
Figure 3:
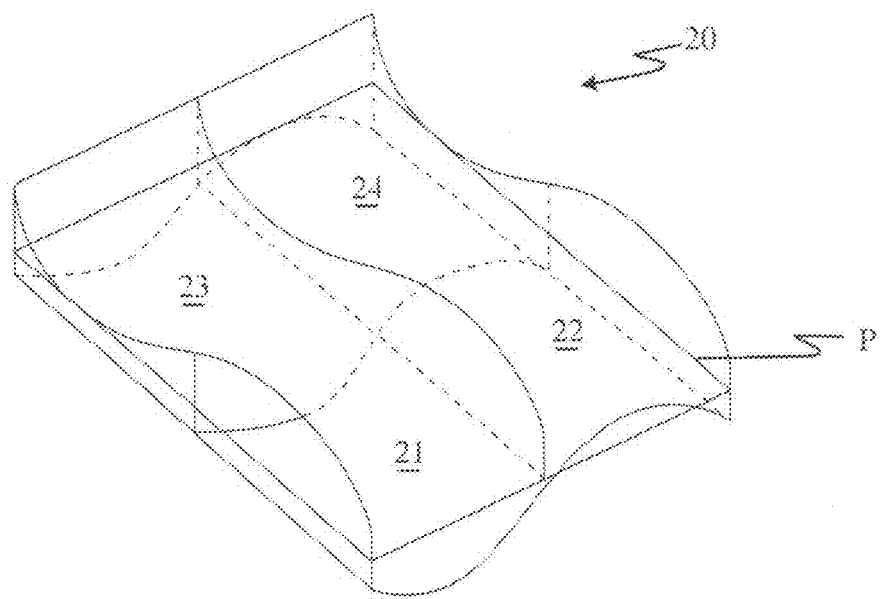
FIG. 3 is a perspective view of the four-region catadioptric tile of FIG. 1, with the reference plane shown.

The total thickness at each location on the rectangular four-region catadioptric tile 20 used in the tessellated projection screen 10 can be defined by a single mathematical expression that uses the axial coordinate references X, Y, and Z depicted in FIG. 2. However, the individual morphologies of the front and rear surfaces 30, 40 are most easily delineated by decomposition of the one expression into two component equations. These two equations define the morphology of the invention, but not the entirety of the invention because there can be coatings and absorbers not described by the equations. The two equations are integrated to each other in the formation of the four-region catadioptric tile 20 by provision of a common reference plane P, as shown in FIG. 3 to be the plane defined by the XY axes of FIG. 2 and a Z location for the origin of coordinates for this plane that is the midpoint along the Z direction between the entry and the reflection primary surfaces at X and Y both equal to zero.

The resultant equation for the thickness $Z_e$ of the filler material layer 50 between the common reference plane P and the front refractive surface 30 (therefore defining the morphology of the front surface 30) of the four-region catadioptric tile 20 is as follows.

$$Z_e = \{[(0.5Y_0/\text{Tan}\phi)^2 - (0.5(y-Y_0))^2]^{0.5}\} + \{\Sigma_i \beta_i \text{Sin}(\pi f_i X/X_0) + K\}$$

Where:

Y is used to define the primary contour of the surface for this equation;

$Y_0$ is one half of the tile dimension along the Y axis;

$\phi$ is one half of an approximate total view-field angle along the Y axis;

$\beta_i$ is amplitude of the maximum deflection relative to the mean value along X;

$f_i$ is spatial frequency as a multiple of the frequency associated with the $2X_0$ frequency;

K is an offset that keeps the front and rear surfaces from physically interfering. It is equal to half of the Z spacing between the primary entry and primary reflection surfaces where X and Y are both equal to zero;

X is used as a variable to define the secondary contour-of-surface in this equation; and $\Sigma_i$ is a summation of a series of sine functions, each identified by a numerical value for subscript i.

The equation that calculates the thickness $Z_r$ relative to the common reference plane P of the region associated with the rear reflective surface 40 (therefore defining the morphology of the rear surface 40) of the four-region catadioptric tile 20 is as follows.

$$Z_r = \{[(X_0/2\text{Sin}\theta)^2 - (X-0.5X_0)^2]^{0.5} + [0.5X_0/\text{Tan}\theta)]\}$$

$$\{0.5X_0[(1/\text{Sin}\theta) - (1/\text{Tan}\theta)]\} + \{\Sigma_j \alpha_j \text{Sin}(\pi\mu_j Y/Y_0) + K\}$$

Where:

X is used to define the primary contour-of-surface for this equation;

$X_0$ is one half of the tile dimension along the X axis;

$\theta$ is one quarter of an approximate total view-field angle along the X axis;

$\alpha_j$ is amplitude of the maximum deflection relative to the mean value along Y;

$\mu_j$ is spatial frequency as a multiple of the frequency associated with the $2Y_0$ frequency;

K is the same offset amount as used for the entry surface equation;

Y is used as a variable to define the secondary contour-of-surface for this equation; and $\Sigma_j$ is a summation of a series of sine functions, each identified by a numerical value for subscript j.

The appropriate use of signs in the equations can be understood by recognizing that the point of intersection of a surface 30, 40 by the Z axis depicted in FIG. 3 and defined in previous discussion serves as a fixed point across which there is reflection in the value for Z at any given set of X and Y on the primary surface contour of the tile 20. For example, if the Z value on the primary surface contour is V above the stated intersection point for coordinates X and Y, then the Z value on the same primary surface contour for coordinates −X and −Y is V below the stated intersection point. Further, it should be understood that the equations for the primary surface contours are approximate, though deviations that will give good tile reflection results will not be far removed from the exact computed contours.

The four-region catadioptric tile 20 whose surface morphologies are based on the above equations according to the present invention will retro-reflect entering light approximately into an angular space enveloped by the angular view angles $\phi$ and $\theta$ as they are input to the equations in accord with the desired viewing volume (region wherein observers satisfactorily see projected image light) of the projected light, where "retro-reflect" herein means to enter the four-region catadioptric tile 20 and reflect back outward within a solid angle surrounding the principle axis of the projection beam's central ray that would exist with reflection if the screen was a planar mirror. The curvatures of the surfaces 30, 40 as prescribed by projected image viewing desires are computed by the equations to provide for horizontal and vertical dispersion of impinging light based upon classic optical refraction and reflection principles.

For the present purpose of discussing the four-region catadioptric tile 20 as used in a vertically oriented tile, axis Y will be taken as pointing vertically, axis Z toward the source of projection light, and axis X is taken to be horizontal. These alignments are convenient for discussion herein, but other orientations are anticipated for the application of the present invention.

Figure 4:
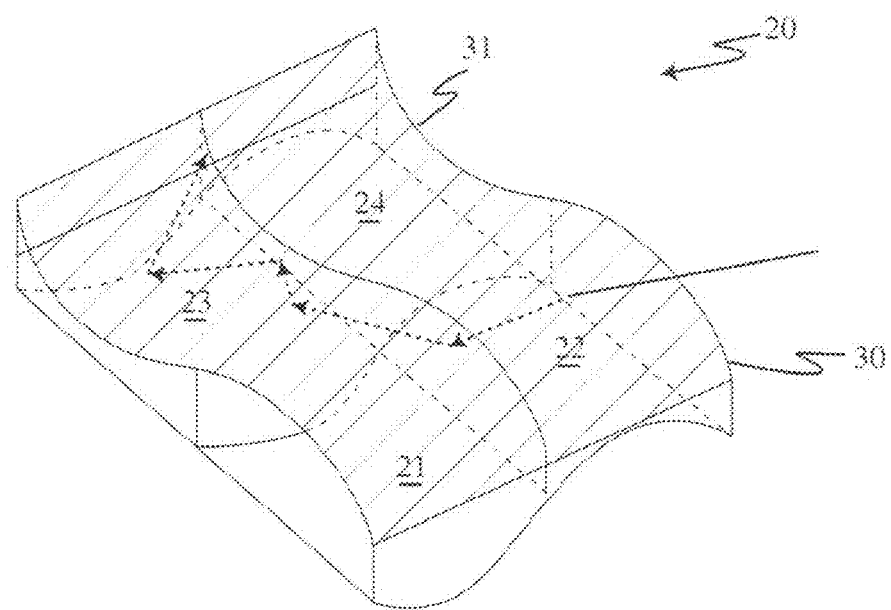
FIG. 4 is a perspective view of the four-region catadioptric tile of FIG. 1, with background light path shown.
Figure 5:
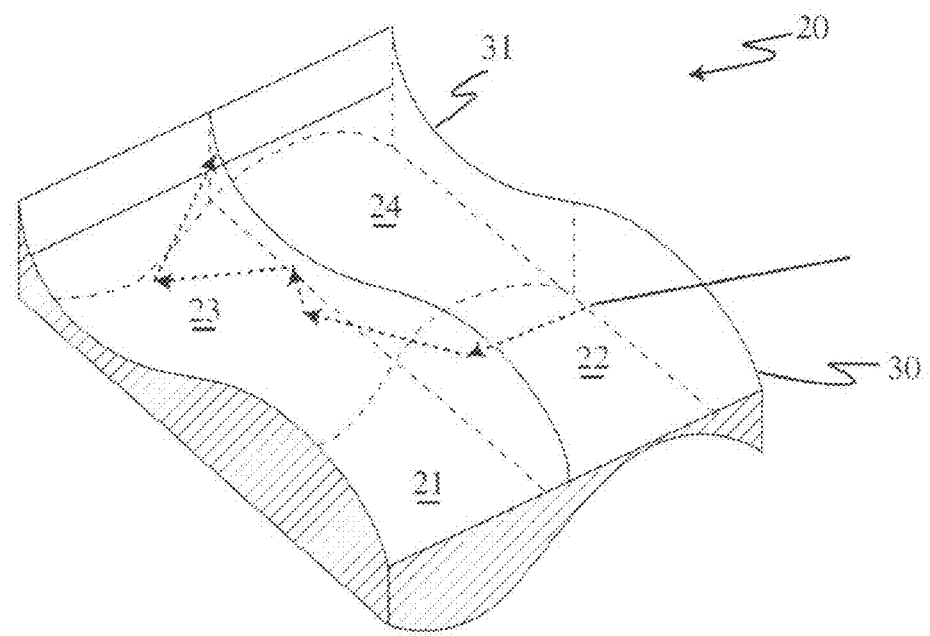
FIG. 5 is a perspective view of the four-region catadioptric tile of FIG. 1, where the four-region catadioptric has an absorptive element for absorbing background light.

To aid in rejection of background overhead light that could compete with the projected light on the four-region catadioptric tile 20, thereby reducing the contrast of any light ray cast upon the tile 20 by the source of projection light, a thin layer 31 can be provided on the front surface 30, as shown in FIG. 4. The refractive index of the thin layer 31 is selected to assist rejection of incoming overhead light by virtue of enhancing the reflection of the front surface 30 towards the ground. At the same time, the internal reflectance of the exit-bound light is made favorable to trap within the four-region catadioptric tile 20 that portion of the overhead light that enters. As depicted in FIG. 4, the overhead light can be trapped via internal reflections and thus will travel a greater distance within the four-region catadioptric tile 20 than the simple round trip distance of the retro-reflection path of the projected light, which does not suffer such entrapment because of the difference in entry angle compared to the background overhead light. This internal entrapment will be discussed later. The filler material layer 50 can include an absorptive element 51, as shown in FIG. 5. The inclusion of the absorptive element 51 in the filler material layer 50 will enhance the absorption of the background overhead light in accord with an exponential relationship to the distance that light travels in the filler material layer 50.

Figure 7:
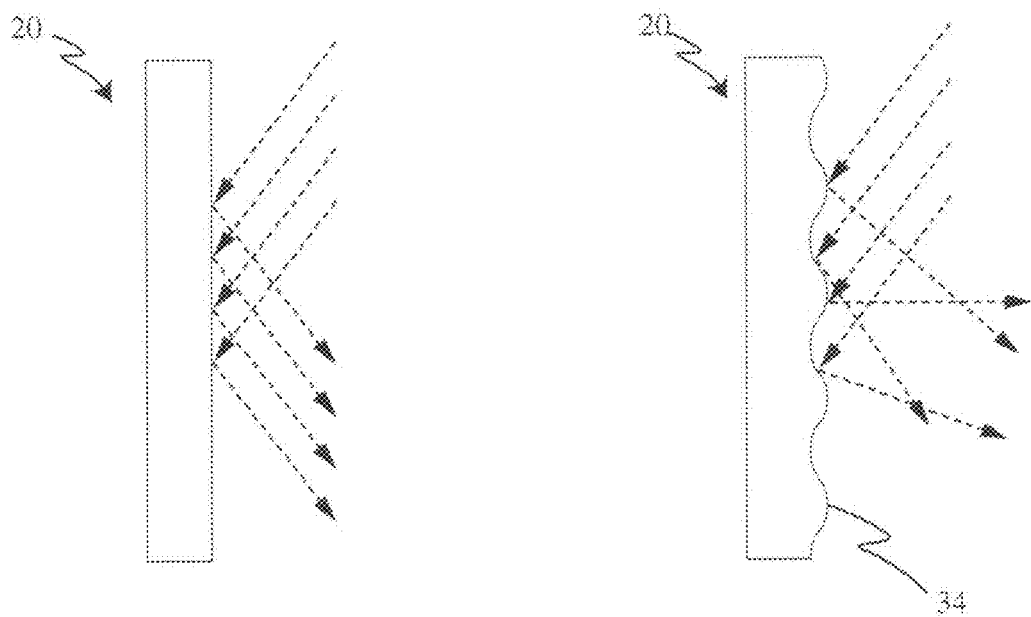
FIG. 7 is a side view for illustrating comparison of different types of surface morphology.

The reflection of the projected light at the refractive front surface 30 can cause a distractive bright line along the Y-axis of the four-region catadioptric tile 20. However, the influence of this bright line can be significantly reduced by dispersing it over a wider region of surface. Conventional attempts to reduce such front surface reflection have employed somewhat isotropic type, non-aligned diffuse scattering outer surface morphologies that by their very nature produce considerable deflection of the overhead light away from a desired downward reflection path and up into the viewer's volume, thereby decreasing the contrast of a projected image. In the present invention the problem with a conventional approach to dispersion of the light using small, non-aligned surface morphology can be avoided by the influence of the equation's secondary contour-of-surface sinusoidal function along the X direction, which is represented by $\{\Sigma_i \beta_i Sin(\pi f_i X/X_0)+K\}$. The significance to this is that it avoids the multi-directional scattering problem encountered with front surface reflection from the aforementioned conventional non-aligned surface morphology. As the four-region catadioptric tile 20 according to the present invention has directionally (vertically) aligned small-scale surface morphology 34, such as incorporated into the secondary surface contours and as partially depicted on the front surface 30 in FIG. 6, the downward component of the overhead light's path is not altered by the striation component of the surface, and a higher level of contrast is maintained. FIG. 7 illustrates the difference between the two types of surface morphology as seen from the side of the screens edge-on.

The combination of the coating on the front surface 30 with the thin layer 31, the vertically aligned striations 34 in the front surface 30, represented by the sinusoidal secondary component along the X direction $\{\Sigma_i \beta_i Sin(\pi f_i X/X_0)+K\}$, and the use of absorptive element 51 in the filler material layer 50 facilitates a unique approach to reducing contrast loss by interference from overhead lighting.

The present invention can also use an outer coating index of refraction that is contrary to conventional screen designs. Conventional designs would use a coating layer as an anti-reflection coating by selecting a material whose refractive index is intermediate between that of air and that of a filler material. This reduces the front surface reflection by easing the entry of light with a more gradual change in refractive indices than would be the case for the filler alone. However, with the four-region catadioptric tile 20 according to the present invention the use of the thin layer 31 is not limited to selection of materials having an index of refraction less than that of the filler material layer 50. In fact, the four-region catadioptric tile 20 can take advantage of having the thin layer 31 with a higher index. In other words, although the index of refraction of the thin layer 31 may be lower than the index of refraction of the filler material layer 50, the index of refraction of the thin layer 31 can be advantageously at least equal to the index of refraction of the filler material layer 50. Further, the index of refraction of the thin layer 31 can also be selected to be at least 10% higher than the refractive index of the filler material layer 50. Further, the index of refraction of the thin layer 31 can also be selected to be at least 25% higher than the refractive index of the filler material layer 50. Further, the index of refraction of the thin layer 31 can also be selected to be at least 50% higher than the refractive index of the filler material layer 50.

With conventional thought such a selection would seem unprofitable because the front surface reflection will be increased as light strikes the screen, thereby increasing any front surface specular flash from the projected light. This extra reflection, however, is mitigated by adjusting the amplitude and frequency of the vertically aligned striations 34 of the front surface 30 to achieve a desirable diffusion of the flash into an acceptable blend with the projected image that results from light that succeeds in entering the four-region catadioptric tile 20 according to the present invention. For example, the amplitude and frequency of the vertically aligned striations 34 can be selected such that the striations 34 spread the front surface reflection to give a brightness reduction as if spread by a width of at least five tile widths. Further, the amplitude and frequency of the vertically aligned striations 34 can be selected such that the striations 34 spread the front surface reflection to give a brightness reduction as if spread by a width of at least ten tile widths. Yet further, the amplitude and frequency of the vertically aligned striations 34 can be selected such that the striations 34 spread the front surface reflection to give a brightness reduction as if spread by a width of at least twenty tile widths. In this matter it should be noted that the primary intended purpose of the vertically aligned striation 34 is to mitigate the flash, not to increase the horizontal component of the viewing volume; although some degree of viewing volume increase does result.

Further, because the overhead light is specularly reflected downward by the front surface 30, the thin layer 31 of coating material having high index of refraction that produces increased front surface reflection has no significant effect. And, because of the higher index of refraction, any overhead light that does enter the four-region catadioptric tile 20 is trapped longer and undergoes added attenuation that improves projected image contrast as seen by the viewer of the image. The physical mechanism for this entrapment is understood by considering the condition of total internal reflection (TIR) based on a sharp change in refractive index at the interface between two materials. TIR is used for many optical devices, such as prisms in binoculars and conduction of signal light in fiber optics.

As the angle of impinging light is decreased from normal incidence towards tangential, shallower incidence, there is an angle at an interface of materials where all of the light moving from a material having a higher index of refraction interfacing into an immediately adjoining material having a lower index of refraction will be totally reflected. This threshold angle is referred to in optical science as the "critical angle." As angles of the light path get more oblique to a surface than this critical angle for TIR, the condition of total reflection continues. At angles steeper than this critical angle some of the light begins to get through the interface between the two materials. Examples of the critical angle between various materials when interfacing with air will help understand the importance of refractive index. The critical angle for diamond is 24 degrees, for sapphire 34 degrees, and for acrylic glass 42 degrees. Accordingly, if the thin layer 31 of the four-region catadioptric tile 20 is a thin coating of diamond, then any entrapped overhead light will have to strike the interface with air at an angle that is quite close to the entry surface's normal in order to escape. Otherwise, it reflects back into the filler material layer 50 to be absorbed. Without the use of the higher index thin layer 31 the light can strike the air-filler interface at angles further off of the tile surface's normal and still escape.

The filler material layer 50 need not be of constant nature with depth. For example, the filler volume can have multiple layers of various refractive indices and/or attenuation coefficients, as well as various shapes of any layer. The filler material layer 50 can also have taper in Z-direction for one or both of the refractive index and attenuation coefficient parameters.

The parameters in the equations defining the thickness of the four-region catadioptric tile 20 can be adjusted to produce the best trade-off between viewing field, image contrast and brightness gain. For example, the parameters in the equations and the indices of refraction of the filler material layer 50 and the thin layer 31 can be selected such that the portion of the overhead light that enters the four-region catadioptric tile 20 from an off-axis angle equal to or greater than 60 degrees will on average be captured within the filler material layer 50 for a minimum of three times the tile thickness. Further, the parameters in the equations and the indices of refraction of the filler material layer 50 and the thin layer 31 may also be selected such that the portion of the overhead light that enters the four-region catadioptric tile 20 from an off-axis angle equal to or greater than 60 degrees will on average be captured within the filler material layer 50 for a minimum of five times the tile thickness. The parameters in the equations and the indices of refraction of the filler material layer 50 and the thin layer 31 may also be selected such that the portion of the overhead light that enters the four-region catadioptric tile 20 from an off-axis angle equal to or greater than 60 degrees will on average be captured within the filler material layer 50 for a minimum of ten times the tile thickness.

A maximum value for the sum of $Z_e$ plus $Z_r$ is preferably 5 mm or less, further preferably 1 mm or less, further preferably 0.5 mm or less, or yet further preferably 0.25 mm or less. $X_0$ is preferably 5 mm or less, further preferably 1 mm or less, further preferably 0.5 mm or less, or yet further preferably 0.25 mm or less. $Y_0$ is preferably 5 mm or less, further preferably 1 mm or less, further preferably 0.5 mm or less, or yet further preferably 0.25 mm or less. $\alpha_j$ and $\beta_i$ are preferably 1.0 or less, further preferably 0.2 or less, or yet further preferably 0.1 or less. In addition, $f_i$ and $\mu_j$ are preferably 1.0 or less, further preferably 0.2 or less, or yet further preferably 0.1 or less.

Included in the equations defining the rear surface 40 is a sinusoidal function, represented by $\{\Sigma_j \alpha_j \text{Sin}(\pi\mu_j Y/Y_0)+K\}$, for imposing directionally (horizontally) aligned crosswise striations on the reflective rear surface 40. This secondary contour function facilitates parameter tradeoffs for controlling the angular directions of that portion of the overhead light that has entered the filler material layer 50 of the four-region catadioptric tile 20, which is desirable to optimize the entrapment of the light by way of increasing the proportion of the light that falls on the refractive front surface 30 from inside the tile 20 fall at angles equal to and more shallow than the TIR critical angle. The crosswise striations also enter into the tradeoff for increasing the vertical view field without having to alter the entry surface morphology. These secondary contour-of-surface functions that are superimposed on the primary contour-of-surface functions consist of the sum of none, or many, sine functions in a series as needed to obtain the best possible tile performance.

The thickness of the filler material layer 50 can be reduced until the front and rear surfaces 30, 40 touch, or can be increased past the point where image projection light leaks between the quadrants of the tiles 20. The K parameter in each equation governs the surface spacing parameters. The attenuation coefficient used to achieve contrast enhancement by reducing the influence of overhead lights can be adjusted in accord with the thickness and standard optical ray tracing of the interfering light's path between the two surfaces 30, 40 before, and if, it escapes out through the front surface 30.

The general figure of each quadrant 21, 22, 23, 24 of the four-region catadioptric tile 20 produces an angular taper in the view field that changes considerably with changes in the equation parameters. The sinusoidal series secondary surface component of the equations, besides facilitating tuning of the striations for best off-axis background light attenuation, also allows for tuning the taper of the projection light as a function of viewer angle.

The reflective rear surface 40 of the four-region catadioptric tile 20 has a concave segment and a convex segment, with each segment having dimension $X_0$ along X direction that shows symmetry across the origin of axes XYZ. The period of a complete cycle across the four-region catadioptric tile 20 along the X direction is therefore $2X_0$. To the reflective rear surface 40 associated with the tile reflective surface cycle is superimposed sinusoid-like striation patterns aligned along the X direction, represented by $\{\Sigma_j \alpha_j \text{Sin}(\pi\mu_j Y/Y_0)+K\}$, in accord with parameters $\alpha_j$ and $\mu_j$. As presented in the foregoing discussion, the four-region catadioptric tile 20 according to the present invention can be tuned to optimize the combinations of gain, contrast and view angle characteristics to an unprecedented degree by virtue of selectability of variables including at least:

Four sets of repeated curve amplitudes;
Four sets of curve repetition rates;
At least one refractive index choice;
At least one attenuation coefficient option;
Multiple spacing coefficients Multiple techniques can be used to fabricate a realization of the four-region catadioptric tile 20 according to the present invention for creation of a tessellated projection screen 10 large enough for displaying a projected image. These include, but are not limited to: machining, milling, etching, photoprocess, broaching, roll forming, flat pressing, stamping, vacuum forming, electroforming, film suspension, molding, casting, injection, deposition, printing and precipitation.

Figure 8:
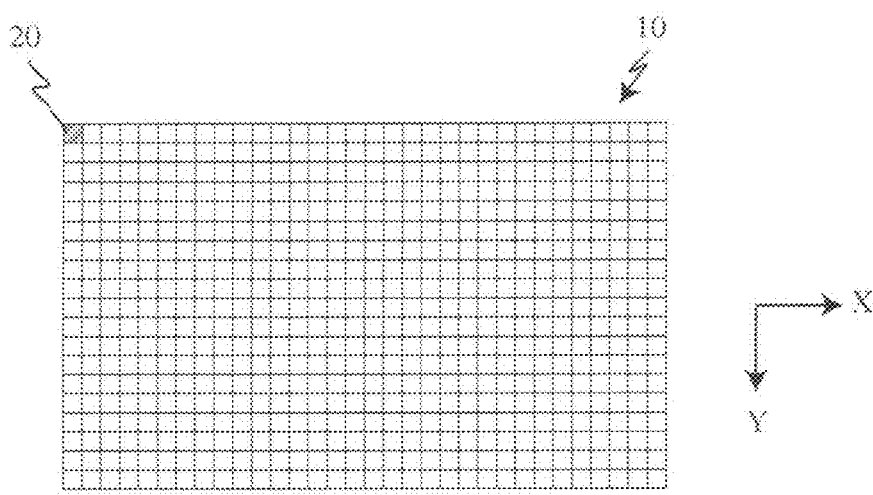
FIG. 8 is a plan view of a tessellated reflective screen according to a preferred application of the four-region catadioptric tile according to the present invention.

Shown in FIG. 8 is a tessellated projection screen 10 according to a preferred application of the four-region catadioptric tile 20 of the present invention. The tessellated projection screen 10 has multiple four-region catadioptric tiles 20. Each of the four-region catadioptric tiles 20 has surface morphology whose general characteristics are repeated across the entire tessellated projection screen 10, but each of which tiles may have variables altered in accord with the equations discussed above, and as appropriate to the position of the tile 20 on the screen surface. The tessellated projection screen 10 can be embodied as a front projection screen, where the front surface 30 is made refractive and the rear surface 40 is made reflective. Alternatively, the tessellated projection screen 10 can be embodied as a rear projection screen, where both the front surface 30 and the rear surface 40 are made transparent.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A four-region catadioptric tile, comprising:
a first surface;
a second surface; and
a filler material layer between said first and second surfaces,
wherein said four-region catadioptric tile has a first region wherein said first surface is convex and said second surface is convex, a second region wherein said first surface is convex and said second surface is concave, a third region wherein said first surface is concave and said second surface is convex, and a fourth region wherein said first surface is concave and said second surface is concave.

2. The four-region catadioptric tile of claim 1, wherein said first surface comprises a transparent refraction surface and said second surface comprises a reflection surface.

3. The four-region catadioptric tile of claim 1, wherein said first surface comprises a transparent refraction surface and said second surface comprises a transparent refraction surface.

4. The four-region catadioptric tile of claim 1, wherein said four-region catadioptric tile is rectangular.

5. The four-region catadioptric tile of claim 1, wherein said first surface is defined by a first equation:

$$Z_e = \{[(0.5Y_0/\text{Tan}\phi)^2 - (0.5(Y-Y_0))^2]^{0.5}\} + \{\Sigma_i \beta_i \text{Sin}(\pi f_i X/X_0) + K\}$$

wherein:
$Z_e$ is a thickness of said filler material layer between a reference plane and said first surface;
$Y_0$ is one half of a dimension of said four-region catadioptric tile measured along a first axis;
Y is a position relative to a center of said four-region catadioptric tile along said first axis;
$\phi$ is one half of an approximate total view-field angle along said first axis;
$\beta_i$ is amplitude of a maximum deflection relative to a mean value along a second axis;
$f_i$ is spatial frequency as a multiple of a frequency associated with $2X_0$ frequency;
$X_0$ is one half of a dimension of said four-region catadioptric tile along said second axis;
X is a position relative to a center of said four-region catadioptric tile along said second axis; and
K is an offset that keeps said first and second surfaces from physically interfering.

6. The four-region catadioptric tile of claim 5, wherein said second surface is defined by a second equation:

$$Z_r = \{[(X_0/2\text{Sin}\theta)^2 - (X-0.5X_0)^2]^{0.5} + [0.5X_0/\text{Tan}\theta)]\}$$
$$+ \{0.5X_0[(1/\text{Sin}\theta) - (1/\text{Tan}\theta)]\} + \{\Sigma_j \alpha_j \text{Sin}(\pi \mu_j Y/Y_0) + K\}$$

wherein:
$Z_r$ is a thickness of said filler material layer between said reference plane and said second surface;
$\theta$ is one quarter of an approximate total view-field angle along said second axis;
$\alpha_j$ is amplitude of a maximum deflection relative to a mean value along said first axis; and
$\mu_j$ is spatial frequency as a multiple of a frequency associated with the $2Y_0$ frequency.

7. The four-region catadioptric tile of claim 6, wherein a maximum value for the sum of $Z_e$ plus $Z_r$ is 5 mm or less, wherein $X_0$ is equal to or less than 5 mm, wherein $Y_0$ is equal to or less than 5 mm, wherein $\alpha_j$ and $\beta_i$ equal to or less than 1.0, and wherein $f_i$ and $\mu_j$ equal to or less than 1.0.

8. The four-region catadioptric tile of claim 6, wherein a maximum value for the sum of $Z_e$ plus $Z_r$ is 1 mm or less, wherein $X_0$ is equal to or less than 1 mm, wherein $Y_0$ is equal to or less than 1 mm, wherein $\alpha_j$ and $\beta_i$ equal to or less than 0.2, and wherein $f_i$ and $\mu_j$ equal to or less than 0.2.

9. The four-region catadioptric tile of claim 6, wherein a maximum value for the sum of $Z_e$ plus $Z_r$ is 0.5 mm or less, wherein $X_0$ equal to or less than 0.5 mm, wherein $Y_0$ equal to or less than 0.5 mm, wherein $\alpha_j$ and $\beta_i$ equal to or less than 0.1, and wherein $f_i$ and $\mu_j$ equal to or less than 0.1.

10. The four-region catadioptric tile of claim 6, wherein a maximum value for the sum of $Z_e$ plus $Z_r$ is 0.25 mm or less, wherein $X_0$ is equal to or less than 0.25 mm, and wherein $Y_0$ is equal to or less than 0.25 mm.

11. The four-region catadioptric tile of claim 6, further comprising a thin layer disposed on said first surface, said thin layer having an index of refraction;
wherein $X_0$, $\theta$, $Y_0$, $\phi$ and said index of refraction of said thin layer are selected such that the portion of light that enters said four-region catadioptric tile from an off-axis angle equal to or greater than 60 degrees is on average captured within said filler material layer for a minimum of three times the mean thickness of said four-region catadioptric tile.

12. The four-region catadioptric tile of claim 6, further comprising a thin layer disposed on said first surface, said thin layer having an index of refraction;
wherein $X_0$, $\theta$, $Y_0$, $\phi$ and said index of refraction of said thin layer are selected such that the portion of light that enters said four-region catadioptric tile from an off-axis angle equal to or greater than 60 degrees is on average captured within said filler material layer for a minimum of five times the mean thickness of said four-region catadioptric tile.

13. The four-region catadioptric tile of claim 6, further comprising a thin layer disposed on said first surface, said thin layer having an index of refraction;
wherein X, $\theta$, $Y_0$, $\phi$ and said index of refraction of said thin layer are selected such that the portion of light that enters said four-region catadioptric tile from an off-axis angle equal to or greater than 60 degrees is on average captured within said filler material layer for a minimum of ten times the mean thickness of said four-region catadioptric tile.

14. The four-region catadioptric tile of claim 5, $\beta_i$, and $f_i$ are selected such that the portion of light that is reflected at said first surface is reduced in brightness as if spread by at least five times the width of said four-region catadioptric tile.

15. The four-region catadioptric tile of claim 5, $\beta_i$, and $f_i$ are selected such that the portion of light that is reflected at said first surface is reduced in brightness as if spread by at least ten times the width of said four-region catadioptric tile.

16. The four-region catadioptric tile of claim 5, $\beta_i$, and $f_i$ are selected such that the portion of light that is reflected at said first surface is reduced in brightness as if spread by at least twenty times the width of said four-region catadioptric tile.

17. The four-region catadioptric tile of claim 6, wherein said first surface's axis comprises a vertical axis and said second surface's axis comprises a horizontal axis.

18. The four-region catadioptric tile of claim 1, further comprising a thin layer disposed on said first surface.

19. The four-region catadioptric tile of claim 18, wherein said thin layer has a refractive index higher than a refractive index of said filler material layer.

20. The four-region catadioptric tile of claim 18, wherein said thin layer has a refractive index at least 10% higher than a refractive index of said filler material layer.

21. The four-region catadioptric tile of claim 18, wherein said thin layer has a refractive index at least 25% higher than a refractive index of said filler material layer.

22. The four-region catadioptric tile of claim 18, wherein said thin layer has a refractive index at least 50% higher than a refractive index of said filler material layer.

23. The four-region catadioptric tile of claim 1, wherein said filler material layer comprises an absorptive element.

24. The four-region catadioptric tile of claim 1, wherein said filler material layer comprises multiple layers.

25. The four-region catadioptric tile of claim 1, wherein said filler material layer has a refractive taper.

26. The four-region catadioptric tile of claim 1, wherein said four-region catadioptric tile is prepared by any process selected from the group comprising machining, milling, etching, photo-process, broaching, roll forming, flat pressing, stamping, vacuum forming, electroforming, film suspension, molding, casting, injection, deposition, printing, and precipitation.

27. A tessellated projection screen comprising:
a plurality of catadioptric tiles, each catadioptric tile having four regions;
each of said catadioptric tiles comprising:
a first surface;
a second surface; and
a filler material layer between said first and second surfaces,
wherein said four-region catadioptric tile has a first region wherein said first surface is convex and said second surface is convex, a second region wherein said first surface is convex and said second surface is concave, a third region wherein said first surface is concave and said second surface is convex, and a fourth region wherein said first surface is concave and said second surface is concave.

28. The tessellated projection screen of claim 27, wherein said first surface is defined by a first equation:

$$Z_e = \{[(0.5Y_0/\text{Tan}\phi)^2 - (0.5(Y-Y_0))^2]^{0.5} + \{\Sigma_i \beta_i \text{Sin}(\pi f_i X/X_0) + K\}$$

wherein:
$Z_e$ is a thickness of said filler material layer between a reference plane and said first surface;
$Y_0$ is one half of a dimension of said four-region catadioptric tile measured along a first axis;
$Y$ is a position relative to a center of said four-region catadioptric tile along said first axis;
$\phi$ is one half of an approximate total view-field angle along said first axis;
$\beta_i$ is amplitude of a maximum deflection relative to a mean value along a second axis;
$f_i$ is spatial frequency as a multiple of a frequency associated with $2X_0$ frequency;

$X_0$ is one half of a dimension of said four-region catadioptric tile along said second axis;
$X$ is a position relative to a center of said four-region catadioptric tile along said second axis; and
$K$ is an offset that keeps the entry and reflective surfaces from physically interfering.

29. The tessellated projection screen of claim 27, wherein said second surface is defined by a second equation:

$$Z_r = \{[(X_0/2\text{Sin}\theta)^2 - (X-0.5X_0)^2]^{0.5} + [0.5X_0/\text{Tan}\theta)]\}$$
$$+ \{0.5X_0[(1/\text{Sin}\theta) - (1/\text{Tan}\theta)]\} + \{\Sigma_j \alpha_j \text{Sin}(\pi \mu_j Y/Y_0) + K\}$$

wherein:
$Z_r$ is a thickness of said filler material layer between said reference plane and said second surface;
$\theta$ is one quarter of an approximate total view-field angle along said second axis;
$\alpha_j$ is amplitude of a maximum deflection relative to a mean value along said first axis; and
$\mu_j$ is spatial frequency as a multiple of a frequency associated with the $2Y_0$ frequency.

30. An angularly dependent retroreflector comprising:
a plurality of catadioptric tiles, each catadioptric tile having four regions;
each of said catadioptric tiles comprising:
a first surface;
a second surface; and
a filler material layer between said first and second surfaces,
wherein said four-region catadioptric tile has a first region wherein said first surface is convex and said second surface is convex, a second region wherein said first surface is convex and said second surface is concave, a third region wherein said first surface is concave and said second surface is convex, and a fourth region wherein said first surface is concave and said second surface is concave.

* * * * *